Patented Nov. 5, 1935

2,019,872

UNITED STATES PATENT OFFICE 2,019,872

ALKYLENEDIGUANIDINE SALTS AND PROCESS OF MAKING SAID SALTS

Erich Prochnow, Berlin-Steglitz, Germany, assignor to Anticoman G. m. b. H., Berlin-Halensee, Germany, a corporation of Germany No Drawing. Application March 2, 1933, Serial No. 659,438. In Germany March 1, 1932

6 Claims. (Cl. 260—125)

My invention relates to a process of producing salts of the alkylenediguanidines by allowing alkylenediamine to react with guanidine sulphocyanate and to salts produced by this process. According to this invention the components are boiled together in an aqueous solution. In a preferred embodiment of the invention the boiling process is carried on in the presence of ammonia.

The process according to this invention distinguishes from known processes in that the reaction may be carried on rapidly without peculiar precaution. There is neither the risk that the reaction proceeds too impetuously, nor the risk that only undesired difficultly soluble resinified by-products arise. At the same time the working losses if compared with known processes may be considerably reduced even if technical initial products are used.

If the boiling together takes place in the presence of ammonia another considerable advantage arises, namely that initial products may be used which contain thiocarbamide or sulphourea as in consequence of the excess ammonia, the sulphoureas also present in the reaction are now converted into guanidine sulphocyanate and may be used up for the process and do not form undesired by-products which may be removed later on only with difficulty.

In another preferred embodiment of my invention for preparing carbonates of the alkylene diguanidine, the alkylenediguanidine produced is dissolved with solvents such as, for instance, hot water or alcohol and this solution is allowed to interact with a hot carbonate solution. A very convenient reliable method thus results for forming alkylenediguanidine carbonate which then may be immediately used in this form or after conversion into other valuable salts. By this process, according to which the alkylenediaguanidine so formed is next dissolved and then is caused to combine with carbonate, the essential advantage results that the alkylenediguanidine carbonate precipitates in the form of a white, lightly flocky to granular deposit and not, as in a dry reaction, an oily, greasy mass.

It is known per se to prepare alkylenediguanidine salts by melting together alkylenediamines and guanidine salts at a temperature of 125–160° C. With this known melting process a yield of about 90% only is then obtained if chemically pure alkylenediamines and pure guanidinesulphocyanate are used. This known process is thus much more expensive since by cleaning the alkylenediamines about 30% will be lost and about 50% as soon as the guanidine salts are so cleaned or purified, and that on account of their easy solubility. Besides, the cleaning process takes much time and requires a complicated apparatus. The alkylenediamines which are to be cleaned or purified by vacuum distillation, sublimate to a high degree, clog the condenser, the inlet to the vacuum pump, and the valves of the vacuum pump so that no continuous working is warranted. The initial product of the guanidine salts such as the guanidine sulphocyanate is prepared from ammonium sulphocyanate. It contains sulphourea to a considerable degree which may be eliminated only with difficulty. If, however, technical alkylenediamines are melted together with technical guanidine salts the yields only amount to 40–60%; byproducts and resins are also produced which may be eliminated only with difficulty.

All these difficulties are eliminated by the process according to this invention. If according to the process of this invention, technical alkylenediamines are boiled together with technical guanidine sulphocyanates in an aqueous ammonia solution of 25%, the yields are increased by about 10%. No byproducts and no resins form, and besides the expensive alkylenediamine used in the reaction may be easily and totally recovered. All components necessary for carrying on the process may be brought together at the same time for manufacturing on a plant scale; the reaction takes place smoothly, no permanent supervision being necessary.

The reaction takes place as follows:

After dissolving guanidine sulphocyanate and decamethylenediamine in water or in an aqueous ammonia solution, decamethylenediguanidine sulphocyanate forms. This salt is easily soluble in hot water, but difficultly soluble in cold water and precipitates partly as an oily mass as soon as the solution cools down; in order to keep the salt in solution, an equal volume of alcohol is added to the hot liquid. If, however, the hot liquid should be introduced into a hot potash solution, decamethylenediguanidine carbonate will form which being insoluble, precipitates and thus may be obtained as a white, lightly flocky to granular powder, on the one hand, whereas potassium sulphocyanate remains in the solution.

The decamethylenediguanidine carbonate forms according to the following reaction equations:

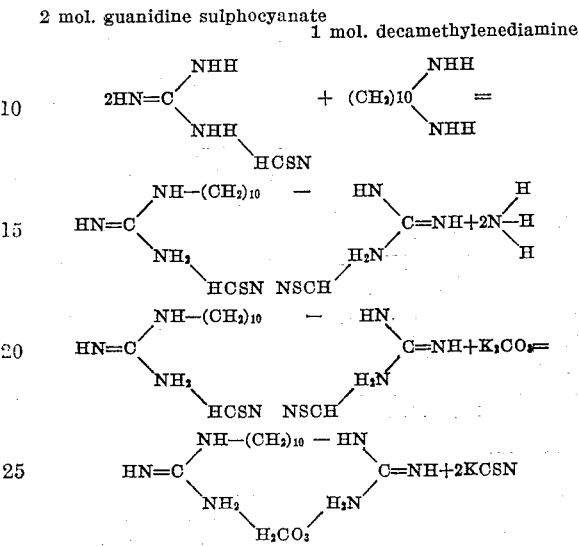

From the carbonate of the alkylenediguanidines the salts of the alkylenediguanidine and the weak inorganic or organic acids may be obtained, thus, for instance phosphoric acid, boric acid, tartaric acid, citric acid, or tannic acid, all of which may be used as a remedy for diabetes and are easily assimilated by the human body without causing any inconveniences and in particular without adversely affecting the stomach or the bowels. All bad effects upon the host are effectively eliminated such as loss of appetite, indigestion, and biliousness, and the psychical apathy and depression, which are caused by the known almost insoluble guanidine preparations.

*Examples*

I. 108 gr. guanidine sulphocyanate and 39 gr. decamethylenediamine are dissolved in 60 ccm. aqueous ammonia of 25% at 60° C. within a glass jar with a reflux condenser and are boiled for about 10-12 hours at a temperature of 80° at the beginning to 120° C. at the end of the period. Add to the hot liquid an equal volume of alcohol or a double volume of boiling water and introduce into hot potash solution.

Decamethylenediguanidine carbonate is formed.
Yield: about 66 gr.

White lightly flocky to granular powder, melting point 176-178° C. Difficultly soluble in hot water, insoluble in cold water, alcohol and ether.

II. 108 gr. guanidine sulphocyanate and 43 gr. dodecamethylenediamine are dissolved in 75 ccm. aqueous ammonia solution of 25% and treated as stated in Example I.

Dodecamethylenediguanidine carbonate is formed.
Yield: 63-66 gr.

White, flocky powder, melting point 184-186° C. Difficultly soluble in hot water, insoluble in cold water, alcohol and ether.

III. 135 gr. technical guanidine sulphocyanate of about 80-90% purity and 50 gr. technical decamethylenediamine of about 80-90% are dissolved in about 75 ccm. aqueous ammonia solution of 25% and then treated as stated in Example I.

Decamethylenediguanidine carbonate is formed.
Yield of pure material 54-65 gr.

From the mother liquor 6 gr. decamethylenediamine may easily be recovered.

IV. 160 gr. technical guanidine sulphocyanate of about 80-90% and 45 gr. technical decamethylenediamine of about 80-90% are solved in 60 ccm. hot water within a glass jar and are vigorously boiled for twelve hours by means of earthen ware boiling stones with a reflux condenser and at the temperature of an oil bath of about 130-140° C. Add to the still warm solution an equal volume of alcohol and introduce into a hot aqueous solution of potassium carbonate of 15% and then after cooling add cold water. Draw off the liquid after 30 hours and wash the deposit.

1. Concentrate the filtrate until crystallization occurs, extract the residue twice with hot alcohol. Almost pure guanidine carbonate will remain which by means of sulphocyanic acid may easily be retransformed into guanidine sulphocyanate.

2. The deposit which consists of decamethylenediguanidine carbonate and diamine carbonate not entered into reaction is acidified and dissolved by heating, in diluted nitric acid and to weakly congo acid reaction. After cooling, draw off the liquid from the crystallized decamethylenediguanidine nitrate and wash out. The crystalline deposit still moist may easily be converted into decamethylenediguanidine carbonate by means of hot potash solution.

Yield: 36-40 gr.

The nitric acid filtrate formed according to the reaction as stated in 2 contains decamethylenediamine not entered into reaction, in the form of its nitrate. It may be used in the plant process for decomposing sodioethoxide when preparing decamethylenediamine. Thus without any surplus work 13-18 gr. technical decamethylenediamine may be recovered.

I claim as my invention:

1. In the process of producing salts of alkylenediguanidine by reacting alkylenediamine with guanidine sulphocyanate the step which comprises boiling the components together in an aqueous solution.

2. In the process of producing salts of alkylenediguanidine by reacting alkylenediamine with guanidine sulphocyanate the step which comprises boiling the components together in an aqueous solution in the presence of ammonia.

3. In the process of producing salts of alkylenediguanidine by reacting alkylenediamine with guanidine sulphocyanate the steps which comprise boiling the components together in an aqueous solution, taking up the alkylenediguanidine so formed in solvents and reacting this solution with a hot carbonate solution.

4. In the process of producing salts of alkylenediguanidine by reacting alkylenediamine with guanidine sulphocyanate the steps which comprise boiling the components together in an aqueous solution in the presence of ammonia, taking up the alkylenediguanidine so formed in solvents and reacting this solution with a hot carbonate solution.

5. The process of producing a salt of alkylenediguanidine substantially readily soluble in water and in gastric juices which comprises boiling alkylenediamine and guanidine sulphocyanate in aqueous solution, taking up the alkylenediguanidine so formed in solvents, reacting this solution with a hot carbonate solution and thereafter treating the carbonate of the alkylenediguanidine so formed with a weak acid selected from the group consisting of phosphoric acid, boric acid, tartaric acid, citric acid and tannic acid.

6. The process of producing a salt of an alkylene diguanidine substantially readily soluble in water and in gastric juices which comprises boiling the alkylenediamine and guanidine sulphocyanate together in an aqueous solution in the presence of ammonia, taking up the alkylenediguanidine so formed in a solvent, reacting this solution with a hot carbonate solution, reacting the carbonate so formed with a weak acid selected from the group consisting of phosphoric acid, boric acid, tartaric acid, citric acid and tannic acid.

ERICH PROCHNOW.